(No Model.)
C. T. BROWN.
MECHANICAL MOVEMENT.
No. 324,003. Patented Aug. 11, 1885.
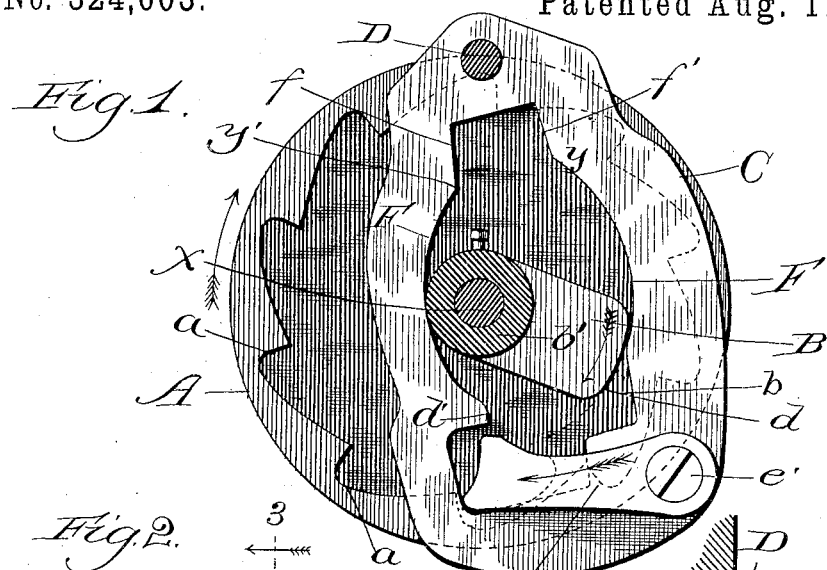
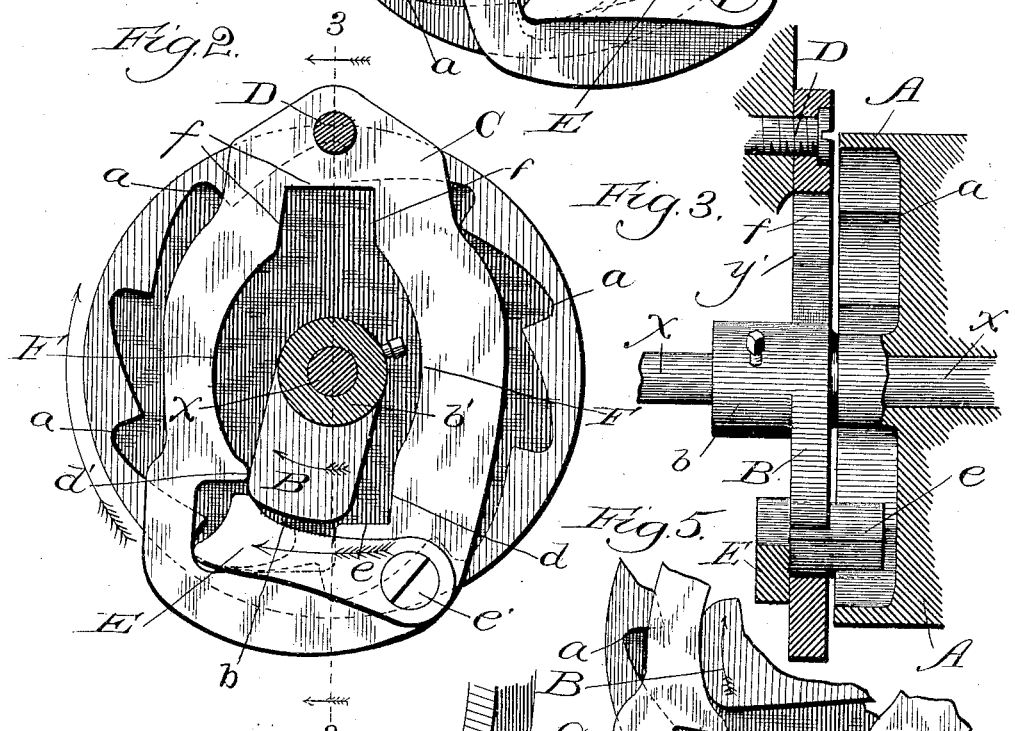
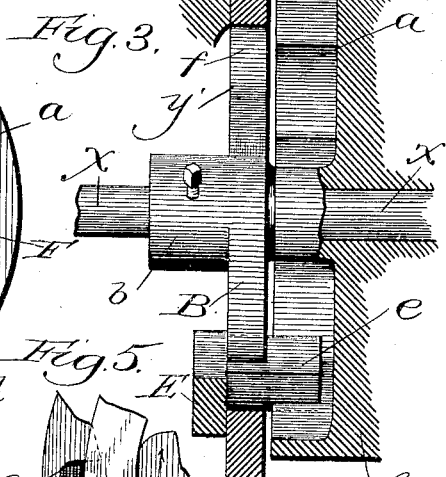
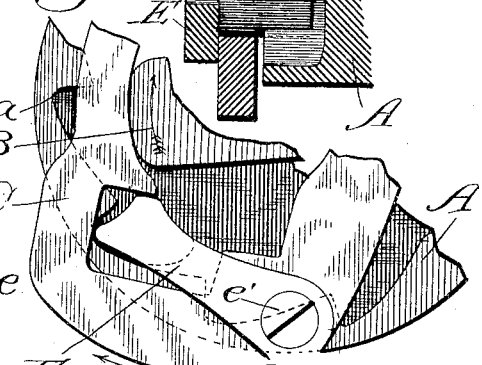
Witnesses
Chas. E. Gaylord
Inventor:
Charles T. Brown

UNITED STATES PATENT OFFICE.

CHARLES T. BROWN, OF CHICAGO, ILLINOIS, ASSIGNOR TO FLORA L. BROWN, OF SAME PLACE.

MECHANICAL MOVEMENT.

SPECIFICATION forming part of Letters Patent No. 324,003, dated August 11, 1835.

Application filed May 1, 1885. (No model.)

*To all whom it may concern:*

Be it known that I, CHARLES T. BROWN, a citizen of the United States, residing at the city of Chicago, in the county of Cook and State of Illinois, have invented certain new and useful Improvements in Mechanical Movements to be Used in Counters for Printing-Presses, &c., and for other Purposes, of which this specification, when taken in connection with the drawings accompanying the same and forming a part hereof, is a full and complete description.

The object of my invention is to obtain mechanism whereby a continuous rotary motion or a twisting or reciprocatory rotary movement may be converted into an intermittent rotary movement, the said intermittent rotary movement thus imparted to be constant and regular without regard to the force or speed of the twisting or reciprocatory rotary motion, as well without regard to the speed of the constant rotary motion when the same is to be reduced to said intermittent rotary movement; to allow of a certain amount of irregularity in the length of the arc inscribed by said twisting or reciprocatory rotary movement, and to obtain a positive movement in said intermittent rotary motion by direct action without the aid or interposition of springs and the like; and, further, to obtain a mechanical movement in which a positive intermittent rotary movement is secured (when desired) when a constant rotary movement in one direction is obtained, while at the same time, when a constant rotary movement in the other direction is had or obtained, no movement whatever is imparted to the wheel or wheels intended, as is hereinafter more fully explained, to receive intermittent rotary motion in the manner stated.

Figure 1 is a plan of my invention. Fig. 2 is a plan of my invention. Fig. 3 is a cross-section of Fig. 2 on line 3 3 thereof. Fig. 4 is a perspective of a portion of my invention. Fig. 5 is a plan of a portion of my invention.

Like letters refer to like parts throughout the several views.

X is the shaft upon which is placed the wheel or wheels to which intermittent rotary motion is to be given, and also an eccentric. A is the wheel to which intermittent rotary motion is to be given, having small teeth $a$ $a$ cast therein. B is an eccentric. $b$ is the outer surface, and $b'$ is the sleeve thereof. C is a yoke or collar placed on pin D. E is a pawl or dog attached to yoke C by pin or screw $e'$, on which screw said pawl or dog may partially rotate. $e$ is a portion of said pawl or dog extending through yoke or collar C and into or over teeth $a$ $a$ of wheel A. F is the inner surface of a portion of yoke or collar C. This inner surface is a portion of an arc having a radius equal to the distance from the center shaft, X, to the outer surface, $b$, of the eccentric B. $d$ and $d'$ is a portion of the inner surface of said yoke or collar, as are likewise surfaces $f f'$.

The manner of operation of my mechanical movement is as follows: Eccentric B, being in the position shown in Fig. 1, has a rotary motion imparted to it in the direction shown by the arrow on face of said eccentric. The outer surface, $b$, of said eccentric describes the arc illustrated by the dotted line in Fig. 1, and comes in contact with the upper surface of pawl E, or nearly so, on that portion of the pawl passing through said collar and lettered $e$, and said pawl is thus driven or forced by said eccentric downward into teeth $a$ or upward into teeth $a$, according to whether said yoke is hung in the manner represented in the drawings, Fig. 1, and viewed in the ordinary manner, or when the same is hung as will appear by holding said drawing upside down. The forward face or surface of eccentric B will now be in contact with face or surface $d'$ of yoke C, and nearly in position shown in Fig. 2. Further rotary movement in the same direction of eccentric B causes yoke C to rotate or turn upon pivot D, thus causing pawl E to have a forward movement in the direction shown by the arrow on said pawl in Fig. 2. Said pawl being still held in position to engage with teeth $a$ of wheel A by said eccentric B, wheel A is thus made to partially rotate in the direction shown by the arrow on the face of said wheel in Figs. 1 and 2. As wheel A thus revolves, the portion of pawl E resting in tooth $a$ is gradually raised by said tooth, and at or immediately after the time when eccentric B leaves surface $d'$ of yoke or collar C and rotates upon or over one of the surfaces F of said yoke pawl or dog E is in the position shown and illustrated in Fig. 5. Surface F being the same arc as is described by surface b of eccentric B, no further movement of yoke C is had until the side or forward face of said eccentric comes in contact with surface f of said yoke C, when, if a continuous rotary motion is had in said eccentric B, the said yoke and eccentric are returned to their original position, as shown in Fig. 1. If before eccentric B or the forward face thereof strikes the said surface f a reciprocatory or backward rotary movement be imparted to said eccentric, said yoke C will likewise remain stationary in the position shown in Fig. 5, and, as last before named, until the then forward side or face of eccentric B strikes the surface d of said yoke, when it will be returned to its original position, as shown in Fig. 1. It will be seen by inspection that when eccentric B or one of its faces is in contact with surface d it will have passed over or beyond portion e of pawl E, and said pawl is therefore not held or forced or maintained in contact with tooth a by said eccentric, and may therefore partially rotate on pin e', and thus allow the return movement necessary in yoke C to restore it to its original position. The portion of pawl E lettered e being thus caused in the forward movement of wheel A to rotate or partially rotate around shaft X, and that portion of yoke or collar C with which the upper surface of said part e comes in contact when the parts are in the position shown in Fig. 5 rotating around pin D, it will be readily seen that no further forward movement in said yoke or collar C and no further rotary movement in wheel A can be had or obtained after such contact; and so long as yoke C is held in this position (see Fig. 5) wheel A is "locked" in such position. This position of yoke C is maintained so long as surface b of eccentric B is in contact with inner surface F of said yoke.

In case the said yoke C is hung in the position illustrated by Fig. 1, when the same is held upside down, a rotary movement in eccentric B or a reciprocatory movement therein in the direction shown by the arrow on the face of said eccentric B will produce the same result just described. If, however, a contrary constant rotary motion be given said eccentric B, at the time when a forward movement is imparted to pawl E by said eccentric, the eccentric will be in contact with faces f f' or between said faces, and pawl E will not be forced upward or into meshing with teeth a, and hence no intermittent rotary or other motion will be imparted to wheel A.

In case a reciprocatory rotary movement is imparted or given to eccentric B in the direction shown by the arrow on the face thereof, the swing or twist of such rotary movement in said eccentric may extend from the point marked y on the inner surface of said yoke around to the point marked y' on said surface, while the intermittent motion given to wheel A will be measured by one of the teeth a, while, if preferred, that degree or amount of twist or partial rotary movement of eccentric B which is indicated by the position of said eccentric illustrated in Figs. 1 and 5, or even less, need only be used; or so much of a rotary motion or twist may be given to said eccentric B as is included between the extreme movements here given.

By the means here shown and described it will be seen that an irregular or variable amount of twist within certain described limits may be given to said eccentric B, and also that, the forward movement of yoke C and wheel A being arrested or stopped by the contact of the upper surface, e, of pawl E with the surface of yoke C, as shown in Fig. 5, the speed or force of the forward movement of said yoke C, and the consequent rotary movement of wheel A, in no way affects the amount of movement in said wheel A. The stop thus formed being a positive stop, not effected by a drag or other spring, no adjusting of the various parts is required to adjust them to strokes of varying length, speed, and force, or either thereof.

Eccentric B may be omitted from the combination hereinabove described, provided a swinging motion to eccentric C is imparted either directly or by any other means, and the above-described lock and the advantages resulting therefrom still retained.

Having thus described my invention, its construction and manner of operation, what I claim, and desire to secure by Letters Patent, is—

1. The combination of an eccentric, a wheel having inside teeth therein, and a yoke or collar having a pawl or dog placed thereon, as described, and for the purpose set forth.

2. Yoke C, having dog or pawl E thereon, in combination with eccentric B and wheel A, having teeth a a therein, substantially as described, and for the purposes specified.

3. In a mechanical movement, wheel A, having teeth a a therein, in combination with yoke C, having dog or pawl E placed thereon, substantially as described, and for the purposes set forth.

CHARLES T. BROWN.

Witnesses:
  M. E. SCOTT,
  THOS. D. DARLOW.